United States Patent
Sauerwald et al.

(10) Patent No.: US 9,992,301 B2
(45) Date of Patent: Jun. 5, 2018

(54) PRIORITIZED THROTTLING IN A MULTIUSAGE ENVIRONMENT

(71) Applicants: Nikolai Sauerwald, Malsch (DE); David Freidlin, Moddin (IL); Andre Fischer, Walldorf (DE)

(72) Inventors: Nikolai Sauerwald, Malsch (DE); David Freidlin, Moddin (IL); Andre Fischer, Walldorf (DE)

(73) Assignee: SAP SE, Walldorf (DE)

( * ) Notice: Subject to any disclaimer, the term of this patent is extended or adjusted under 35 U.S.C. 154(b) by 240 days.

(21) Appl. No.: 13/928,236

(22) Filed: Jun. 26, 2013

(65) Prior Publication Data

US 2015/0006710 A1    Jan. 1, 2015

(51) Int. Cl.
*G06F 15/173* (2006.01)
*H04L 29/08* (2006.01)
*H04L 12/26* (2006.01)

(52) U.S. Cl.
CPC .......... *H04L 67/322* (2013.01); *H04L 67/125* (2013.01); *H04L 43/0817* (2013.01); *H04L 43/0888* (2013.01); *H04L 43/16* (2013.01)

(58) Field of Classification Search
CPC ............. H04L 67/1002; H04L 67/1008; H04L 67/1012; H04L 67/1029; H04L 43/16; H04L 67/322; H04L 67/125; H04L 43/0817; H04L 43/0888; H04N 21/2405; G06F 2209/5021; G06F 11/3433
See application file for complete search history.

(56) References Cited

U.S. PATENT DOCUMENTS

| | | | | |
|---|---|---|---|---|
| 6,055,564 | A  * | 4/2000 | Phaal ............................ | 709/207 |
| 8,132,031 | B2 * | 3/2012 | Barsness et al. ............. | 713/320 |
| 8,555,282 | B1 * | 10/2013 | Kahn .................... | G06F 9/4881 718/100 |
| 2005/0034129 | A1 * | 2/2005 | Chew .................. | G06F 9/44594 718/100 |
| 2014/0196048 | A1 * | 7/2014 | Mathur ................... | G06F 9/485 718/104 |

* cited by examiner

*Primary Examiner* — Ryan Jakovac
(74) *Attorney, Agent, or Firm* — Mintz Levin Cohn Ferris Glovsky and Popeo, P.C.

(57) ABSTRACT

Prioritization criteria can be applied to assign a priority ranking to server processes executed by a backend server, and a utilization of the backend server by server demands can be quantified. Upon determining that the quantified utilization of the backend server has reached or exceeded one or more determined limits on backend utilization, at least a lowest priority server process can be throttled based on one or more throttling parameters.

20 Claims, 4 Drawing Sheets

| System alias | Max system utilization (Backend DB layer) | Max system utilization (Backend application layer) | Min system utilization (Backend DB layer) | Min system utilization (Backend application layer) | Time interval in seconds (for checking the system load) |
|---|---|---|---|---|---|
| ERP | 90% | 80% | 85% | 75% | 10 |
| CRM | | | | | |

| SERVICE_ID | SYSTEM_ALIASES | Priority (for being processed) | Throughput 1 per time unit (must always be allowed) | Throughput 2 per time unit (should not lead to throttling) | Throughput 3 per time unit |
|---|---|---|---|---|---|
| Material | ERP | 2 | 100 | 500 | 1,000 |
| Customer | ERP | 1 | 50 | 70 | 90 |

FIG. 4

PRIORITIZED THROTTLING IN A MULTIUSAGE ENVIRONMENT

TECHNICAL FIELD

The subject matter described herein relates to prioritizing and throttling of demands on a backend system.

BACKGROUND

The utilization of many on-line transactional processing (OLTP) systems relative to the amount of available resources is currently increasing due to a number of factors, such as for example loads imposed by a number of trends in business software development, including but not limited to increased access via mobile devices; high performance, in-memory database management, which typically includes heavier use of system memory as well as processing capabilities; cloud storage or other distributed computing approaches, which can tend to reduce the amount of free hardware resources to any given process due to sharing of the available resources across multiple end users; and the like. Backend transactional processing systems are also experiencing increasing loads due to additional usage by on-line analytical processing (OLAP) functionality, such as is incorporated in enterprise resource planning (ERP) and other business software frameworks.

Such additional loads can present challenges in resource allocation at the database server level, which in many system is not readily scalable. These challenges can include insufficient hardware resources to meet a demand at a given time, poor performance for multiple concurrent users of a system due to scalability problems, etc.

The challenge of insufficient hardware resources to handle an additional processing load can arise, for example, in situations in which additional load on a backend system occurs without concurrent increases in available hardware for a database server. A typical example can be increasing support for mobile device capabilities without immediately adding to the available backend hardware. In some examples, an intermediate time period of months to perhaps years can occur between introduction of additional mobile device functionality and the buying of new hardware to increase the available backend resources. During this intermediate period, users can experience decreased performance, particularly at times of heavy backend usage.

Mobile devices can also significantly increase the number of users making concurrent demands on work in the system. In addition, the access behavior of mobile device users can typically be more "peaky" or temporally uneven compared to those of non-mobile computing devices. The difference between the peak load caused by mobile device users and the average load caused by mobile device users is typically higher than users of non-mobile computing devices. Accordingly, allowing increased accessibility to a backend system via mobile device increase the probability of temporary resource shortages, even after installation of additional hardware for the backend server.

The challenge of scalability can arise due to relatively limited scaling capabilities of a typical database server. Additional load can cause a server system to exceed its scaling limit, which can also lead to performance issues. In-memory database systems and other comparable approaches can achieve high performance through parallelization approaches. However, if multiple users execute a highly parallelized process, performance degradation can occur.

SUMMARY

Consistent with implementations of the current subject matter, an improved approach to prioritization and throttling of additional usage of OLTP systems can be applied. Among other potential advantages, negative impacts on existing core OLTP services can be avoided or at least mitigated.

In one aspect, a method includes applying one or more prioritization criteria to assign a priority ranking to each of a plurality of server processes being executed by a backend server, and quantifying a utilization of the backend server by a plurality of server demands. The plurality of server demands includes the plurality of server processes being executed by the backend server. The method further includes determining that the quantified utilization of the backend server has reached or exceeded one or more determined limits on backend utilization and throttling at least a lowest priority server process of the plurality of server processes based on one or more throttling parameters.

In some variations one or more of the following features can optionally be included in any feasible combination. The method can further include de-throttling a highest priority, previously throttled server process when the utilization of the backend server has reached or dropped below one or more second limits on backend utilization. The prioritization criteria can include at least one of a program type, a specific program, a specific user or a group of users, a business case or group of business cases. The quantifying can further include at least one of determining a percentage of available processor cycles currently in use, determining a number of calls to the backend server per a given unit of time, and using one or more key performance indicators. The one or more throttling parameters can be defined universally and/or with one or more aspects that are specific to at least one of a specific server process, a type of server process, a specific user, and a specific type of user. The one or more throttling parameters can include a plurality of sets of throttling parameters that are applied stepwise as the utilization of the backend server increases.

Implementations of the current subject matter can include, but are not limited to, systems and methods including one or more features described herein as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 shows another table illustrating example parameters consistent with implementations of the current subject matter.

When practical, similar reference numbers denote similar structures, features, or elements.

DETAILED DESCRIPTION

Implementations of the current subject matter can support improved capabilities for prioritization and throttling of usage of backend transaction processing systems (e.g. OLTP systems, database servers, etc.). For example, when more than one server process places demand on a database server or the like, the requesting server processes can be prioritized, and those server processes with lower priority can be throttled. As used herein, the term "throttled" or "throttling" refers to reducing an amount of system resources available to one or more server processes as a function of the prioritization of multiple server processes with demands on the server. A server process refers generally to a set of one or more processing tasks performed by a server to respond to requests from client programs, execute database retrieval and updates, manage data integrity, dispatch responses to client requests, and the like. Prioritization criteria can be monitored, quantified, measured, or the like, and upon making a determination that one or more server processes should be throttled, the throttling can occur according to one or more throttling parameters.

The terms throttling and de-throttling are used in this disclosure to refer to an increase in an amount of throttling and a decrease in an amount of throttling, respectively. An increase in throttling of a server process indicates that the server process is provided with fewer computing resources and therefore is likely to run slower than it would if it were not throttled. Conversely, a decrease in throttling (i.e. a de-throttling) of a server process indicates that the server process is provided with additional computing resources and therefore is likely to run faster than it would if it were not throttled. An increase in throttling therefore refers to a reduction in resources allocated to a server process while a decrease in throttling (or an increase in de-throttling) refers to an increase in resources allocated to a server process.

Also in the following description, reference is made to prioritization of server processes. A lower priority server process is one that is subject to throttling before a higher priority server process. For example, in a ranking order or server processes according to priority, a highest priority server process might have a ranking of 1 while a next highest priority server process might have a ranking of 2.

A backend system can include one or more servers, such as for example a database server, an application server, etc. Features of the current subject matter may be applicable to any kind of backend server, and may be particularly advantageous as applied to database servers. Throughout this disclosure, the term backend server can refer generally to either or both of a database server and an application server unless otherwise specified either explicitly or by the context of such description.

Figure 1:
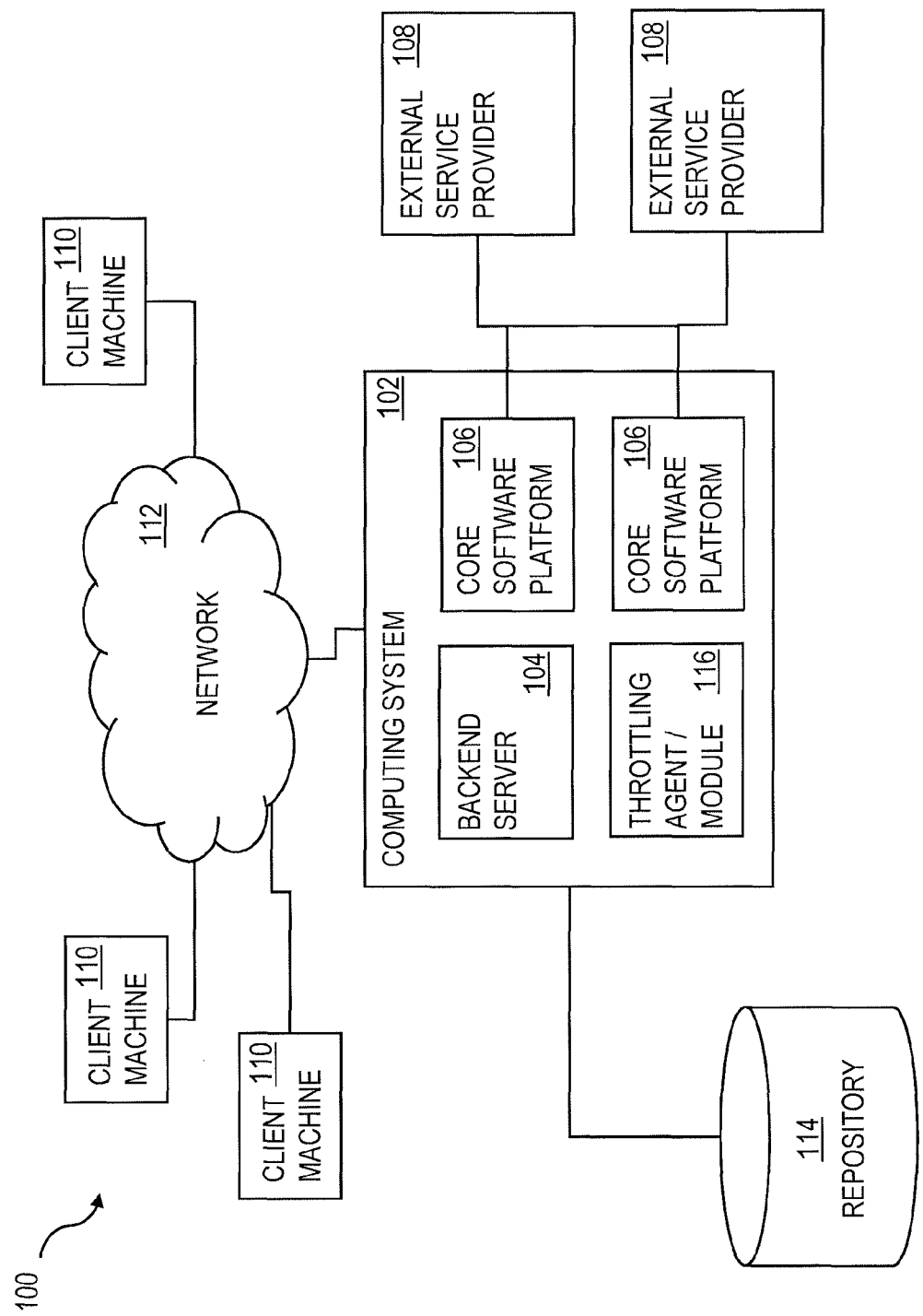
FIG. 1 shows a diagram illustrating aspects of a system showing features consistent with implementations of the current subject matter.

FIG. 1 shows a diagram 100 illustrating an example of a client-server arrangement via which multiple server demands can be placed upon a computing system 102, which can include a backend server 104. In some examples, the backend server 104 can be a database server. The backend server 104 can be implemented on one or more computing systems 102, each optionally including one or more processors or processor cores, etc. For example, the computing system 102 shown in FIG. 1 can include multiple processors capable of parallelizing one or more processing tasks in response to requests on the backend server 104. For the purposes of this disclosure and the claims, unless otherwise explicitly stated or in some other way clearly excluded by context, a computing system 102 refers broadly to any configuration consistent with implementation of a backend server 104 either on a self-contained system with one or more processors or on a distributed set of systems each with one or more processors.

In a non-limiting example, the backend server 104 can support one or more functions of a core software platform of an enterprise resource planning (ERP) system, other business software architecture, or the like. The computing system 102, or optionally a separate computing system, can include one or more core software platform modules 106 providing one or more features of the business software system. The computing system 102 or separate computing system can also aggregate or otherwise provide a gateway via which users can access functionality provided by one or more external service providers 108. One or more client machines 110 can access the computing system 102 and the services implemented on the computing system 102, either via a direct connection, a local terminal, or over a network 112 (e.g. a local area network, a wide area network, a wireless network, the Internet, or the like). The one or multiple remote devices can optionally include one or more of desktop computers, laptop computers, terminal machines, mobile devices (e.g. smart phones, tablets, etc.), or the like. The backend server 104 can access one or more databases or other repositories 114. In some examples, the one or more databases or other repositories 114 can include metadata repositories and/or other data repositories (e.g. process repositories, scenarios repositories, transactional data repositories, etc.) that can store definitions of business scenarios, business processes, and one or more business configurations as well as transactional data, metadata, master data, etc. relating to definitions of the business scenarios, business processes, and one or more business configurations, and/or concrete instances of the data objects (e.g. business objects) that are relevant to a specific instance of the business scenario or a business process.

A throttling agent or module 116 can be hosted on the computing system 102 or alternatively, on an external system accessible over a network connection. The throttling agent or module 116 can optionally include one or more discrete software and/or hardware modules that perform operations such as those described herein.

In a high performance, in-memory database environment or other system in which multiple processor cores are made available for parallel processing of database server tasks, the degree of parallelization can be used a prioritization criterion. In some examples, the degree of parallelization can be assigned a greater importance than other prioritization criteria, such as or example the throughput per time unit. As an illustrative example, a database system with 32 processor cores handling a report for a first user that is parallelized across the 32 cores and takes 20 seconds would be completely unavailable to any other users for those 20 seconds, which is a generally unacceptable result in an OLTP environment.

A typical objective of a business use case of a backend server 104 to support "cloud" services (e.g. in a software as a service or SaaS arrangement) is the optimal usage of a certain amount of hardware. By supporting multiple users, ideally with temporally offset usage patterns, a given set of hardware resources can potentially be more efficiently utilized. However, this added utilization can introduce one or more risk factors that may result in reduced performance. For example, increased response times can occur due to queuing effects, short-term periods of over-utilization of the system resources can occur due to peak loads experienced by one or more of the multiple users, longer-term over-utilization of the system resources can occur due to peak loads occurring for many of the multiple users at the same time (e.g. end of the calendar year, etc.). The business impact of such situations can depend strongly on the specific program or type of program affected.

Figure 2:
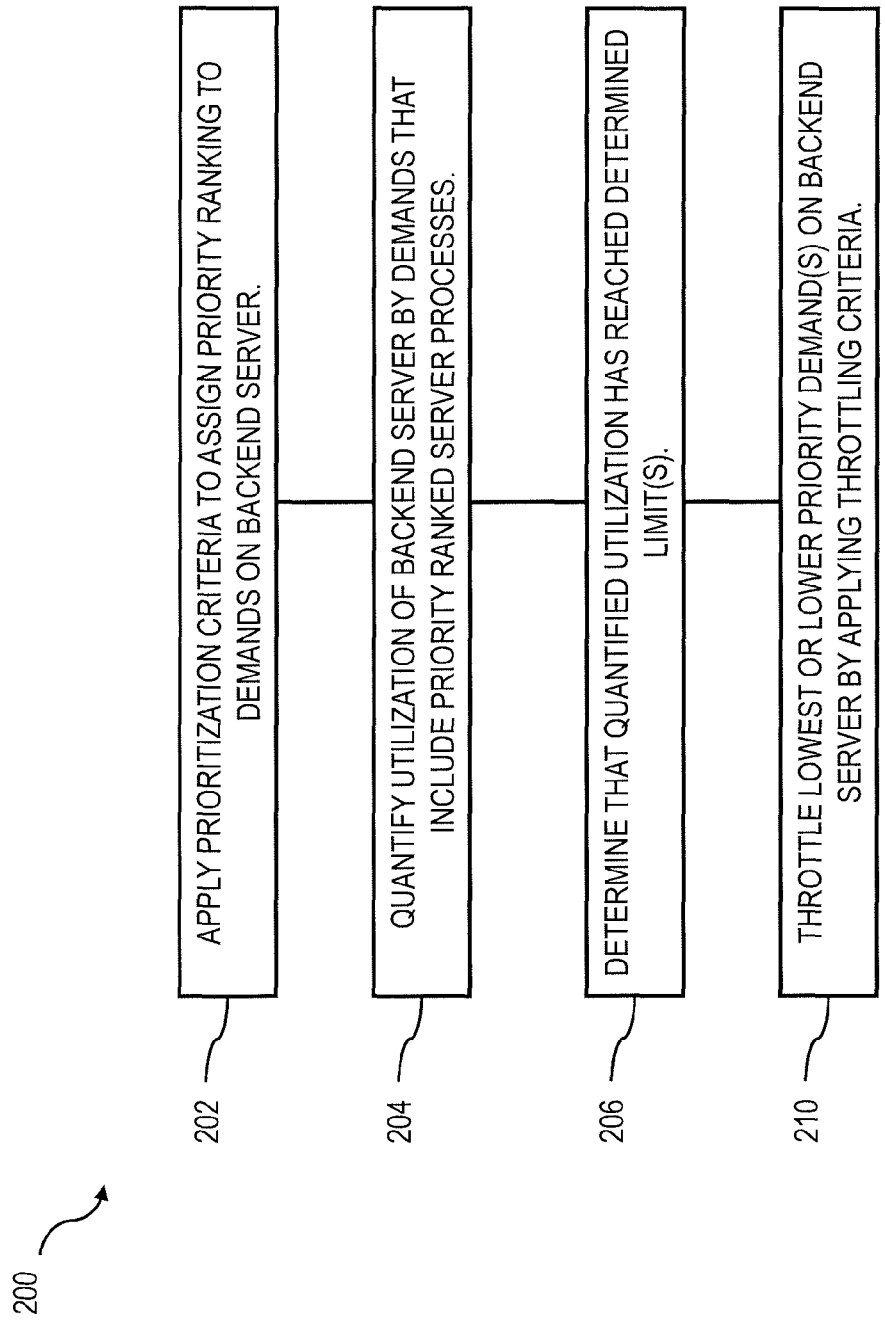
FIG. 2 shows a process flow diagram illustrating aspects of a method having one or more features consistent with implementations of the current subject matter.

FIG. 2 shows a process flow chart 200 illustrating features of a method consistent with an implementation of the current subject matter. One or more of these features can be included in other implementations. At 202, a set of prioritization criteria (which can include one or more criteria) is applied to assign a priority ranking to a plurality of server processes being executed by a backend server 104. Prioritization criteria for choosing which of a set of server processes (or the services that these server processes support) imposing demands on system resources should be throttled can include, but are not limited to, one or more of a program type (e.g. a dialog, a report, a batch, etc.), a specific program (e.g. a backend service, such as for example one called by a mobile device), a specific user or a group of users (e.g. different users or groups of users can be given different priorities), a business case or group of business cases (e.g. a certain program might be called in different business cases with a different priority), and the like in any feasible combination.

At 204, a utilization of the backend server 104 by a plurality of server demands is quantified. The plurality of server demands includes the plurality of server processes being executed by the backend server 104. Utilization can be quantified using one or more approaches, such as for example a percentage of available processor cycles currently in use, a number of calls to the backend server 104 per a given unit of time, using one or more key performance indicators (KPIs) as described in more detail below, and the like. One or more of an analysis of available system resources as well as a current consumption rate of those resources by running server processes can optionally be part of the quantification of the utilization of the backend server 104.

When, at 206, the utilization of the backend server 104 is determined to have reached or exceeded one or more benchmark utilization levels, which can take the form of one or more determined limits on backend utilization, at 210 at least a lowest priority server process can be throttled based on one or more throttling parameters. The throttling can include allocating a smaller amount of the available resources of the backend server 104 to the throttled server process. The one or more throttling parameters can optionally be defined universally (e.g. applicable to all processes or demands on the backend server in a same manner) or with one or more aspects that are specific to one or more specific server processes, one or more types of server processes, one or more specific users, one or more specific types of user, etc.

If the one or more determined limits are reached again at a subsequent time, that is if at a later time a quantified utilization of the available resources of the backend server 104 is determined to have reached the one or more determined limits, the throttling process can repeat. A current one or more lowest priority server processes can be throttled. The currently running server processes can optionally be re-prioritized prior to the subsequent reaching of the one or more determined limits. For example, one or more processes that remain throttled based on an application of one or more throttling parameters in response to a preceding reaching of the one or more determined limits can optionally be assigned a higher priority. This assigning of a higher priority can optionally be accomplished by including as a prioritization criterion an indication of whether a given server process is currently in a throttled condition, whether a given server process has recently (e.g. within some period of time prior to the current throttling exercise) been subject to throttling, etc.

In some implementations of the current subject matter, the quantification of the utilization of the backend server 104 can be made based on non-real time data. For example, a periodic calculation can be made of backend server utilization; a rolling average of backend server utilization can be calculated continuously, semi-continuously, periodically, or the like; etc. In an advantageous implementation, a more fine-grained metric or measurement of backend utilization can be useful, for example to provide the ability to address more dynamic variations in utilization occurring due to non-constant, potentially unpredictable demands on the server resources, for example such as might arise from multiple users.

In some implementations of the current subject matter, a resource consumption record can be maintained for each server process. The record can reflect either or both of usage by a server process over a recent, relevant interval and usage by the server process since the server process was initiated. Resource consumptions records with these or similar features can be used in prioritizing currently running server processes. For example, the prioritization criteria can specify that one or more server processes that consume resources but do so for a prolonged period of time can be assigned a low prioritization such that these processes are slowed down (throttled) relative to other, shorter duration processes, which are assigned a higher priority. Such an approach can prevent or mitigate the problem of relatively low priority, long-running processes or tasks monopolizing usage of available system resources while a system is currently very busy (e.g. responding to many requests or executing many server processes concurrently). Also prediction of what it should be using (long relative to expectations)

The throttling parameters and the one or more determined limits and quantified usage of the backend server 104 can optionally be based on one or more utilization metrics, which can advantageously be used individually or in any feasible combination. The one or more metrics can include a number of calls per a period of time, a measure of resource consumption of a database (DB) central processing unit (CPU) or central processing units per a period of time (e.g. as a percentage of the total DB CPU time), utilization of the OLTP database per a period of time, a degree of parallelization, and the like. In at least some implementations of the current subject matter, a same utilization metric or set of utilization metrics is used as both a throttling parameter and a determined limit that, when exceed, prompts a throttling process.

A utilization metric that includes a number of calls per a period of time, a CPU resource consumption per a period of time, or the like can be implemented as part of a determined limit defined as a number of calls are allowed to be processed per time unit or an amount of CPU resources on the backend server system 104 that can be consumed per time unit. The use of a consumed amount of CPU resources as the utilization metric can be a more detailed approach in that information about the CPU consumption of each process is gathered, advantageously without causing too much overhead consumption of backend server resources. The use of a number of calls per unit time is less detailed, because a relatively constant baseline CPU consumption at the database server is generally present. A more detailed approach can advantageously handle differing demands on the server resources that variations between the amount of server resources required to respond to specific calls of a group of calls.

In an example of such an approach, a server process can determine, estimate, etc. an amount of backend resources (e.g. time usage of a database server, etc.) was required to complete the server process. This determined usage by the server process can be returned to a computing system that includes a throttling framework as described herein. In this manner, a more detailed understanding of actual usage can be provided in a more timely manner, without incurring a large amount of processing overhead. Because information on server process usage of system resources can be provided very quickly, a real time or close to real time approach can be supported. For example, a backend process can determine its own resources at the end of its own lifetime. This determining can enable the relevant data of the resource consumption to be sent as part of the API to the caller of the backend process. As such, when the caller receives the semantics (e.g. the output, the results, etc.) of the call, it also has the resource consumption of the call. Such an approach can be beneficial not only to the database times of the call, but can also assist in discovery (quickly and without much additional hardware resources) of whether a call required a long time because it needed much CPU time or whether it needed long time because the CPUs were overloaded and the wait time of the process were so high.

In some implementations of the current subject matter, a level of utilization of the backend server can be defined at a finer granular scale. For example, to allow a cascading throttling and prioritization approach, the throttling and prioritization can also be dependent on an amount of utilization of the OLTP database server. Accordingly, this information can advantageously be part of the utilization metrics used in setting either or both of determined limits and throttling parameters.

In some implementations of the current subject matter, approaches based on a dynamic quantification (e.g. a measurement, an estimation, a calculation, etc.) can be further enhanced by a cascading approach. A cascading approach can have features including determining an extent to which a maximal possible load on the backend server 104 can be decreased upon a determination that the database server utilization is too high (e.g. upon determining that the current utilization of the backend server 104 has exceeded at least one determined limit) and also determining an extent to which the maximal possible additional load can be increased upon a determination that the database server utilization is sufficiently low to not incur performance degradation for most users.

An ability to dynamically change a determined limit on utilization of the backend server that causes throttling and to use a second limit to cause one or more throttled server processes to be provided with additional resources (e.g. "de-throttled") can, in some implementations of the current subject matter, include use of an algorithm defining which of several limits are valid dependent on a current utilization of the backend server 104.

As the utilization of the backed server 104 is quantified, a stepwise approach to prioritized throttling can be achieved. In other words, some implementations of the current subject matter can provide the ability to determine that a quantified utilization of the backend server 104 is "too high" (e.g. exceeds a determined throttling threshold) and can sequentially throttle (e.g. reduce the availability of resources to) lowest priority server processes as follows. First, a lowest priority server process can be throttled. If the quantified utilization continues to exceed the determined throttling threshold, a next lowest priority server process can be throttled. This sequence can continue until the quantified utilization of the backend server 104 no longer exceeds the determined throttling threshold.

Throttling can be reversed consistent with implementations of the current subject matter. In a similar stepwise manner to the approach discussed above for throttling, a de-throttling approach can be used to increase the resources available to a server process that has previously be subject to throttling. For example, upon a determination that a quantified utilization of the backend server 104 is "too low" (e.g. is below a determined de-throttling threshold) previously throttled server processes can be sequentially de-throttled (e.g. provided with additional resource availability) in order from a highest priority throttled server process (e.g. a last server process subjected to throttling) to lowest priority throttled server. First, a highest priority previously throttled server process can be de-throttled. If the quantified utilization continues to be below the determined de-throttling threshold, a next highest priority previously throttled server process can be de-throttled. This sequence can continue until the quantified utilization of the backend server 104 is no longer below the determined de-throttling threshold.

The throttling threshold and the de-throttling threshold need not be equivalent and can advantageously be different. For example, the throttling threshold can be larger than the de-throttling threshold such that server processes are not rapidly throttled and de-throttled if the backend utilization oscillates or otherwise varies by a small amount near a threshold.

A further aspect of a stepwise prioritized throttling and de-throttling approach can include support for different definitions or designations to identify which server processes among the active server processes at the backend server 104 are to be throttled at which stages of a stepwise sequence. For example, in a first grouping of (lowest priority ranking) server processes to be throttled, a first set of throttling parameters can include a first set of resource access limitations to be applied to the throttled server processes, which are throttled in order of increasing priority as necessary to reduce the quantified utilization of the backend server 104 below the determined limit. A second grouping of server processes can include those server processes with priority rankings that are greater than the highest priority ranked server process in the first grouping. A second set of throttling parameters, which can include a second set of resource access limitations, can be applied to the server processes in the second grouping in order of increasing priority ranking as necessary to reduce the quantified utilization of the backend server 104 below the determined limit.

The groupings of resource access limitations can advantageously include at least one group of limitations intended to reduce an overall load or utilization of the backend server 104 via throttling of one or more server processes in order of increasing prioritization ranking of the server processes (e.g. during periods of high utilization) and at least one group of limitations intended to increase an overall load or utilization of the backend server 104 via de-throttling of one or more server processes in order of decreasing prioritization ranking of the server processes (e.g. during periods of low utilization).

Figure 3:
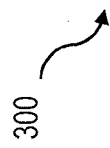
FIG. 3 shows a table illustrating example parameters consistent with implementations of the current subject matter.

In an illustrative example, a combination of metrics including a number of calls per unit time and an amount of utilization of an OLTP database accessed by a backend server 104 can be used for prioritized throttling of calls from mobile devices being received (e.g. via a gateway or other network portal) at a backend system such as those supporting enterprise resource planning (ERP) systems, customer relationship management (CRM) systems, or the like. FIG. 3 and FIG. 4 respectively show a "system" table 300 and a "service" table that include examples of prioritization criteria and throttling parameters that can be applied for a backend server 104 that serves both an ERP and a CRM system.

As shown in the system table 300 in FIG. 3, maximum and minimum system utilization can be applied optionally at both the database and the application layers of a system. Also defined in the system table 300 is a time interval over which the quantification of the backed server utilization should occur. The system table 300 defines utilization in terms of a percentage of the maximum utilization of the underlying hardware. Other approaches to defining the utilization of the backend server that are consistent with this disclosure are also within the scope of the current subject matter.

The service table 400 includes columns relating to a first throughput ("Throughput 1"), a second throughput ("Throughput 2"), and a third throughput ("Throughput 3") and also a column listing a priority for each of two services: "material" and "customer" provided via the ERP system. Referring back to the database server maximum system utilization and minimum system utilization values in FIG. 3, these can be respectively applied as a throttling threshold and a de-throttling threshold consistent with the descriptions above. For a database backend layer applying these throttling and de-throttling thresholds, if the ERP system usage is less than the "minimum system utilization" of 85%, no throttling occurs. As the utilization of the database backend layer increases to between 85% and 90% (the "maximum system utilization"), a stepwise alternating throttling approach can be applied. When a level of more than 1,000 calls for Material (lower priority, corresponding to a priority rank of 2 as shown in FIG. 4) are reached in a time interval of 10 seconds and the system utilization is reached, an exception can be thrown for all calls exceeding 1000 for Material on the ERP system. After the 10 second time interval, the backend system utilization is quantified again, and if it remains above the maximum capacity limit, the calls to the service with the next higher priority (Customer on ERP, which has a priority rank of 1 as shown in the table 400) can be limited to a total of 90 for a 10 second interval. If there were already less than 90 calls in the last 10 seconds, the throttling is also applied for the next service ID (not shown in the table 400 of FIG. 4), and so on. In the event that all services defined in the service table 400 are already throttled according to the parameters in the third throughput column and further throttling is determined to be required, the further throttling can proceed according to the parameters defined in the second throughput column. Advantageously, the parameters in the second throughput column can be calculated in design time (e.g. before execution at runtime). These parameters can advantageously sum to the max percentage allowed for gateway services (10%).

If the utilization of the backend server 104 remains too high even after all server processes applicable under the second throughput column have been throttled, this can indicate that calls of mobile devices must be further throttled. In the example of FIG. 4, after the throttling of defined in the first throughput column has been done, no other throttling is done.

This stepwise process can optionally include any number of sets of throttling parameters for the server processes to be throttled with increasing utilization of the backend server 104. For example, the table 400 includes three sets of throttling parameters summarized in the Throughput 1, Throughput 2, and Throughput 3 columns. However, in various implementations of the current subject matter, a stepwise throttling approach can include four or more set of throttling parameters for the server processes to be throttled. A simple implementation of the current subject matter can include only two throughput values for each service or other consumer of backend resources. In addition to a defined minimum throughput that must always be allowed (e.g. Throughput 1 in the service table 400 of FIG. 4), a second throughput column can include the limited usage of the different applications at the point where a certain target percentage usage of the backend is reached (e.g., a limit can be imposed where no more than 10% of the backend resources are allowed to be used in sum by mobile devices). Finer granularity of regulation of the throttling can be achieved by addition of more throughput columns. For example, a third set of throughput values for the services (e.g. Throughput 3 in the service table 400 of FIG. 4) can be helpful in avoiding a condition in which an application with a lower priority is throttled as a result of an application with a higher priority needing 100 times more resources than planned according to the Throughput 2 values. Having more than three columns can enable even finer granular approaches.

As noted above, implementations of the current subject matter can also include an approach to de-throttling of previously throttled server processes. For example, if a determined or defined minimum utilization of the backend server 104 is not reached, the amount of throttling applied to server processes executing on the backend server 104 can be decreased. In some examples, the throttling can be increased only in cases in which the utilization is bigger than a maximum utilization. Throttling can be maintained at a current, stable condition when the utilization is between a minimum utilization and the maximum utilization. In the event that the utilization becomes lower than the minimum utilization, the amount of throttling can be decreased again (more resources can be directed to running serve processes) in a de-throttling process as discussed above. Decreasing of the throttling can occur in a stepwise manner similar to that for increasing the throttling. However, the triggers limits can be minimum utilization values. In some implementations of the current subject matter, it can be advantageous for the trigger utilization value to be used for de-throttling of server processes to be lower than the utilization value that leads to a stepwise increase in throttling. This approach can allow some degree of stability in the current throttling state rather than causing a rapid cycling of throttling and de-throttling in the event that the utilization of the backend server 104 happens to oscillate about a single utilization limit that is used for both increasing and decreasing throttling.

In further implementations of the current subject matter, one or more performance KPIs of the backend server 104 can be calculated. These KPIs can include, but are not limited to, the amount of database (e.g. OLTP) usage required by a call, the amount of processor resources required by the call, etc. The KPIs can be calculated in real time or near real time, e.g., at the end of a call to the backend server 104. Using conventional approaches, it has typically been possible only to access performance KPIs of a certain step after that step was finished. This delay can require additional calls and infrastructure and therefore additional time, additional resources, time delays, etc.

For a prioritized throttling approach consistent with implementations of the current subject matter, "self reaction" of programs during their runtime can be possible. A program can self-throttle if it determines that it will require more resources than are available and/or it needs more resources than predicted. As an example of self-throttling, a program can perform any applicable approach to reducing its usage of computing resources. As non-limiting examples, a program can make execution breaks, reduce its degree or parallelization, etc.

In cases where the throttling is made on a different system and in cases of the consolidation of performance KPIs of the backend system on another system (e.g. in a gateway situation as discussed above), conventional approaches would generally include one or more of three ways of transporting performance KPIs. In one approach, each set of performance KPIs for a process is sent back with the next round-trip. In another approach, each set of performance KPIs for a process is fetched from the backend server, e.g. by a remote function call (RFC), and in still another approach, many sets of performance KPIs for a batch or group of processes is fetched from the backend server, e.g. by RFC.

In contrast, in implementations of the current subject matter, a server process can call a program sub unit, which returns information about the current hardware resource consumption of the server process. This call can include an option to include the resource consumption caused by all parallelized child processes triggered by a main 'mother' process (e.g. parallelization on a database layer of a high performance database. If this call is made directly before the end of the server process, the hardware resource consumption of the process can be known in the process itself and can be sent together with other exporting data to the caller of the process. This approach can also support scenarios in a multi server environment.

In a single server environment, the call to the program sub unit to acquire an amount of current hardware resource consumption can be made after certain time intervals. Depending on the detected hardware resource consumption of the server process and depending on the utilization of the whole backend server, the program can be capable of reacting on resource bottlenecks and can optionally stop or interrupt the processing, reduce the degree of parallelization, etc. This capability can allow programs with higher priority to continue. When the utilization of the server decreases again, the throttled programs can continue the work in a normal way without disturbing other programs running with a higher priority.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
    applying one or more prioritization criteria to assign a priority ranking to each of a plurality of server processes being executed by a backend server;
    quantifying a utilization of the backend server by a plurality of server demands, the plurality of server demands comprising the plurality of server processes being executed by the backend server;
    first determining that the quantified utilization of the backend server has reached or exceeded one or more determined limits on backend utilization;
    throttling, in response to the first determining, at least a lowest priority server process of the plurality of server processes based on a first throttling parameter of one or more throttling parameters, wherein the throttling comprises allocating a first nonzero amount of one or more resources of the backend server to the lowest priority server process, wherein the first nonzero amount is smaller than a first amount of the one or more resources allocated to the lowest priority server process before throttling, and wherein the first throttling parameter is based on a utilization metric of the backend server with the lowest priority server process comprising a longest duration of utilization of the backend server;
    assigning, in response to the throttling of at least the lowest priority server process, a different priority ranking to each of the plurality of server processes;
    second determining, in response to the throttling of at least the lowest priority server process, whether a current utilization of the backend server is still at or above the one or more determined limits on backend utilization, wherein the different priority ranking is assigned based on whether a server process of the plurality of server processes has been throttled within a certain time period prior to the second determining; and
    throttling, in response to the second determining and when the current utilization of the backend server is still at or above the one or more determined limits on backend utilization after the second determining, a next to lowest priority server process of the plurality of server processes by allocating a second nonzero amount of the one or more resources to the next to lowest priority server process, the throttling of the next to lowest priority server process based on a second throttling parameter of the one or more throttling parameters, wherein the second nonzero amount is smaller than a second amount of the one or more resources allocated to the next to lowest priority server process before throttling, wherein the next to lowest priority server process is determined based on the different priority ranking assigned to each of the plurality of server processes.

2. A computer program product as in claim 1, wherein the operations further comprise:
    determining, in response to the throttling of at least the lowest priority server process and/or the throttling of the next to lowest priority server process, an amount a maximum possible load on the backend server can be increased; and
    de-throttling, based on the determined amount and when the quantified utilization satisfies a de-throttling threshold, a highest priority, previously throttled server process.

3. A computer program product as in claim 1, wherein the prioritization criteria comprise at least one of a program type, a specific program, a specific user or a group of users, a business case or group of business cases.

4. A computer program product as in claim 1, wherein the quantifying further comprises at least one of determining a percentage of available processor cycles currently in use, determining a number of calls to the backend server per a given unit of time, and using one or more key performance indicators.

5. A computer program product as in claim 1, wherein the one or more throttling parameters are defined universally and/or with one or more aspects that are specific to at least one of a specific server process, a type of server process, a specific user, and a specific type of user.

6. A computer program product as in claim 1, wherein the one or more throttling parameters comprise a plurality of sets of throttling parameters that are applied stepwise as the utilization of the backend server increases.

7. A system comprising:
    at least one programmable processor; and
    a machine-readable medium storing instructions that, when executed by the at least one programmable processor, cause the at least one programmable processor to perform operations comprising:
        applying one or more prioritization criteria to assign a priority ranking to each of a plurality of server processes being executed by a backend server;
        quantifying a utilization of the backend server by a plurality of server demands, the plurality of server demands comprising the plurality of server processes being executed by the backend server;

first determining that the quantified utilization of the backend server has reached or exceeded one or more determined limits on backend utilization;

throttling, in response to the first determining, at least a lowest priority server process of the plurality of server processes based on a first throttling parameter of one or more throttling parameters, wherein the throttling comprises allocating a first nonzero amount of one or more resources of the backend server to the lowest priority server process, wherein the first nonzero amount is smaller than a first amount of the one or more resources allocated to the lowest priority server process before throttling, and wherein the first throttling parameter is based on a utilization metric of the backend server with the lowest priority server process comprising a longest duration of utilization of the backend server;

assigning, in response to the throttling of at least the lowest priority server process, a different priority ranking to each of the plurality of server processes;

second determining, in response to the throttling of at least the lowest priority server process, whether a current utilization of the backend server is still at or above the one or more determined limits on backend utilization, wherein the different priority ranking is assigned based on whether a server process of the plurality of server processes has been throttled within a certain time period prior to the second determining;

throttling, in response to the second determining and when the current utilization of the backend server is still at or above the one or more determined limits on backend utilization after the second determining, a next to lowest priority server process of the plurality of server processes by allocating a second nonzero amount of the one or more resources to the next to lowest priority server process, the throttling of the next to lowest priority server process based on a second throttling parameter of the one or more throttling parameters, wherein the second nonzero amount is smaller than a second amount of the one or more resources allocated to the next to lowest priority server process before throttling, wherein the next to lowest priority server process is determined based on the different priority ranking assigned to each of the plurality of server processes;

third determining, in response to the throttling of at least the lowest priority server process and/or the throttling of the next to lowest priority server process, an amount a maximum possible load on the backend server can be increased and that the quantified utilization of the backend server satisfies a de-throttling threshold; and de-throttling, in response to the third determining, a highest priority, previously throttled server process.

8. A system as in claim 7, wherein the de-throttling threshold is less than the one or more determined limits on backend utilization.

9. A system as in claim 7, wherein the prioritization criteria comprise at least one of a program type, a specific program, a specific user or a group of users, a business case or group of business cases.

10. A system as in claim 7, wherein the quantifying further comprises at least one of determining a percentage of available processor cycles currently in use, determining a number of calls to the backend server per a given unit of time, and using one or more key performance indicators.

11. A system as in claim 7, wherein the one or more throttling parameters are defined universally and/or with one or more aspects that are specific to at least one of a specific server process, a type of server process, a specific user, and a specific type of user.

12. A system as in claim 7, wherein the one or more throttling parameters comprise a plurality of sets of throttling parameters that are applied stepwise as the utilization of the backend server increases.

13. A computer-implemented method comprising:

applying one or more prioritization criteria to assign a priority ranking to each of a plurality of server processes being executed by a backend server;

quantifying a utilization of the backend server by a plurality of server demands, the plurality of server demands comprising the plurality of server processes being executed by the backend server;

first determining that the quantified utilization of the backend server has reached or exceeded one or more determined limits on backend utilization;

throttling, in response to the first determining, at least a lowest priority server process of the plurality of server processes based on a first throttling parameter of one or more throttling parameters, wherein the throttling comprises allocating a first nonzero amount of one or more resources of the backend server to the lowest priority server process, wherein the first nonzero amount is smaller than a first amount of the one or more resources allocated to the lowest priority server process before throttling, and wherein the first throttling parameter is based on a utilization metric of the backend server with the lowest priority server process comprising a longest duration of utilization of the backend server;

assigning, in response to the throttling of at least the lowest priority server process, a different priority ranking to each of the plurality of server processes;

second determining, in response to the throttling of at least the lowest priority server process, whether a current utilization of the backend server is still at or above the one or more determined limits on backend utilization, wherein the different priority ranking is assigned based on whether a server process of the plurality of server processes has been throttled within a certain time period prior to the second determining; and throttling, in response to the second determining and when the current utilization of the backend server is still at or above the one or more determined limits on backend utilization after the second determining, a next to lowest priority server process of the plurality of server processes by allocating a second nonzero amount of the one or more resources to the next to lowest priority server process, the throttling of the next to lowest priority server process based on a second throttling parameter of the one or more throttling parameters, wherein the second nonzero amount is smaller than a second amount of the one or more resources allocated to the next to lowest priority server process before throttling, wherein the next to lowest priority server process is determined based on the different priority ranking assigned to each of the plurality of server processes.

14. A computer-implemented method as in claim 13, further comprising:

determining, in response to the throttling of at least the lowest priority server process and/or the throttling of the next to lowest priority server process, an amount a maximum possible load on the backend server can be increased; and de-throttling, based on the determined amount and when the quantified utilization satisfies a de-throttling threshold, a highest priority, previously throttled server process.

15. A computer-implemented method as in claim 13, wherein the prioritization criteria comprise at least one of a program type, a specific program, a specific user or a group of users, a business case or group of business cases.

16. A computer-implemented method as in claim 13, wherein the quantifying further comprises at least one of determining a percentage of available processor cycles currently in use, determining a number of calls to the backend server per a given unit of time, and using one or more key performance indicators.

17. A computer-implemented method as in claim 13, wherein the one or more throttling parameters are defined universally and/or with one or more aspects that are specific to at least one of a specific server process, a type of server process, a specific user, and a specific type of user.

18. A computer-implemented method as in claim 13, wherein the one or more throttling parameters comprise a plurality of sets of throttling parameters that are applied stepwise as the utilization of the backend server increases.

19. A computer-implemented method as in claim 13, wherein at least one of the applying, the quantifying, the determining, and the throttling is performed by a system comprising at least one programmable processor.

20. A computer program product comprising a non-transitory machine-readable medium storing instructions that, when executed by at least one programmable processor, cause the at least one programmable processor to perform operations comprising:

applying one or more prioritization criteria to assign a priority ranking to each of a plurality of server processes being executed by a backend server, the plurality of server processes prioritized to include a lowest priority server process and a next to lowest priority server process;

first determining that a quantified utilization of the backend server has reached or exceeded one or more limits on backend utilization;

first throttling, when the quantified utilization of the backend server is determined to have reached or exceeded one or more limits on backend utilization, the lowest priority server process by at least allocating a first nonzero amount of one or more resources of the backend server to the lowest priority server process, wherein the first nonzero amount is smaller than a first amount of the one or more resources allocated to the lowest priority server process before the first throttling;

assigning, in response to the throttling of at least the lowest priority server process, a different priority ranking to each of the plurality of server processes;

second determining, in response to the throttling of at least the lowest priority server process, whether a current utilization of the backend server is still at or above the one or more determined limits on backend utilization, the different priority ranking assigned based on whether a server process of the plurality of server processes has been throttled within a certain time period prior to the second determining; and throttling, in response to the second determining and when the current utilization of the backend server is still at or above the one or more determined limits on backend utilization after the second determining, a next to lowest priority server process of the plurality of server processes by allocating a second nonzero amount of the one or more resources to the next to lowest priority server process, the throttling of the next to lowest priority server process based on a second throttling parameter of the one or more throttling parameters, wherein the second nonzero amount is smaller than a second amount of the one or more resources allocated to the next to lowest priority server process before throttling, wherein the next to lowest priority server process is determined based on the different priority ranking assigned to each of the plurality of server processes.

* * * * *